United States Patent Office 3,551,487
Patented Dec. 29, 1970

3,551,487
PROCESS FOR PREPARING CYCLOHEXYLAMINE
Bernard R. Bluestein, Glen Rock, Jack M. Solomon, West Caldwell, and Lawrence B. Nelson, Franklin Lakes, N.J., assignors to Witco Chemical Company, Inc., New York, N.Y., a corporation of Delaware
No Drawing. Filed June 6, 1968, Ser. No. 734,895
Int. Cl. C07c *85/06, 85/08*
U.S. Cl. 260—563            7 Claims

ABSTRACT OF THE DISCLOSURE

Process of preparing cyclohexylamine from mixtures of cyclohexanol and cyclohexanone by passing such mixtures, together with ammonia and hydrogen, in the vapor phase at atmospheric pressure, over a heated copper chromite/nickel catalyst.

---

Our invention is directed to an improved process for preparing cyclohexylamine from mixtures of cyclohexanol and cyclohexanone.

Processes for the preparation of cyclohexylamine from cyclohexanol or cyclohexanone, broadly speaking, have long been known and have been disclosed in various patents and other publications. In certain instances, the known processes have involved contacting cyclohexanone with ammonia and hydrogen, at atmospheric pressure, with a nickel catalyst at temperatures of the order of 265 to 285° F. In other processes, cyclohexanol, in admixture with ammonia and hydrogen, has been passed into contact with a foraminate Ni/Al catalyst, at temperatures of the order of 390° F., under superatmospheric conditions, e.g., 17 atmospheres gauge. These, and other processes for the production of cyclohexylamine, are shown in U.S. Pats. Nos. 1,762,742; 1,982,985; 2,017,069; 2,033,866; 2,636,902; 3,219,704 and 3,239,562. While various of said processes produce good yields of cyclohexylamine, in general such procedures possess one or more disadvantages in that they require the utilization of substantial superatmospheric pressures; or they require the use of substantially pure feedstocks of cyclohexanol or cyclohexanone, as the case may be, depending upon the particular process involved, in order to obtain good yields of cyclohexylamine; or they require the use of relatively expensive catalysts, or they require quite long reaction times; or they produce low yields of cyclohexylamine or poor selectivity and high proportions of undesired byproducts.

The process of our present invention has a number of advantages in that it produces excellent yields of cyclohexylamine from starting mixtures of cyclohexanol and cyclohexanone, such as produced by the oxidation of cyclohexane by well known procedures without the necessity of effecting separation of the cyclohexanol and cyclohexanone from each other. In addition, our process is carried out at atmospheric or substantially atmospheric pressure. The catalyst which is utilized, which is a mixture of copper chromite and nickel, is readily prepared and is economical in cost and produces high yields of cyclohexylamine with good selectivity and low amounts of byproducts and at relatively low temperatures.

The starting mixtures of cyclohexanol and cyclohexanone, as stated above, can be and most desirably are prepared by the oxidation of cyclohexane in the liquid phase by molecular oxygen, particularly air, as shown, for instance, in U.S. Pats. Nos. 2,223,494 and 2,557,281. The unreacted cyclohexane and other byproducts are removed by known procedures and the cyclohexanol-cyclohexanone mixtures commonly contain approximately equal proportions of cyclohexanol and cyclohexanone or, in certain cases, of the order of about 55% cyclohexanol and about 45% cyclohexanone. Such mixtures, as so produced, provide an excellent starting material or feedstock for our process. However, mixtures of cyclohexanol and cyclohexanone in which the cyclohexanol content is materially greater or materially less than 55% by weight of such mixtures can also be used effectively in the practice of the process of our invention. The proportions of the cyclohexanol and cyclohexanone should be such that said mixture is normally liquid. Generally speaking, we prefer to use mixtures in which the cyclohexanol constitutes from about 50 to 65% by weight, balance essentially cyclohexanone.

The copper chromite-nickel catalyst can be prepared in various ways and with variable contents of nickel, generally in the range of 10 to 75% copper chromite and 90 to 25% nickel, particularly desirable being about 40% copper chromite and about 60% nickel. The said catalyst is carried on an inert support as, for example, kieselguhr, gamma alumina, pumice, asbestos and silica gel. Particularly preferred is kieselguhr. One illustrative procedure for producing a suitable copper chromite-nickel catalyst is as follows:

Equimolar quantities of copper nitrate (or other easily decomposable copper salts) and chromic acid are dissolved in a minimum amount of distilled water, to which is added 30% by weight of kieselguhr. The mixture is stirred and heated to dryness and the powder residue is shaped into 1/8" tablets and calcined in the presence of air at 600° F. for 2 to 4 hours. This results in the production of the copper chromite on kieselguhr. The nickel is produced similarly, that is, nickel nitrate is dissolved in a minimum amount of distilled water and 42% by weight of kieselguhr is added, the mixture is stirred, heated to dryness, the powder residue shaped and calcined in air at about 600° F. for 2 to 4 hours. Approximately equal quantities of the tablets are mixed together.

The molar ratios of the ammonia and of the hydrogen to the cyclohexanol-cyclohexanone mixture utilized in the reaction are variable.

In the case of the molar ratio of the ammonia to the cyclohexanol-cyclohexanone mixture, a molar ratio of at least 1:1 is utilized with a molar ratio well in excess thereof being preferred. Molar ratios in the range of 2:1 to 5:1 are desirable although the molar ratios may be very substantially in excess thereof as, for instance, 10:1 to 20:1 and even much greater. Especially advantageous are molar ratios of 3:1 to 4:1 such as 3.3:1 or 3:5 to 1.

In the case of the molar ratios of the hydrogen to the cyclohexanol-cyclohexanone mixture, a molar ratio of about 1.5:1 results in the production of approximately equal proportions of monocyclohexylamine and dicyclohexylamine. Molar ratios less than 1.5:1 produce dicyclohexylamine as the predominant product of the reaction. It is particularly advantageous to use molar ratios of the order of 6.5:1. The use of hydrogen in substantial excesses has no material effect on the results. As a practical proposition, therefore, molar ratios of more than 1.5:1 should be employed and, more desirably, molar ratios well thereabove as, for instance, 3:1 to 10:1 or higher.

The contact times between the reaction mixture and the catalyst are variable but, in general, are of short duration, generally in the range of 1 to 30 seconds. In most cases, contact times of from about 5 to 15 seconds are satisfactory, with about 10 seconds being particularly desirable, depending, however, on the specific activity of the catalyst and the temperature at which the reaction is carried out. Reaction temperatures will, in the usual case, range from about 375 to 525° F., advantageously from about 400 to 500° F. with about 500° F. being substantially optimum in most cases. Unreacted material can, of course, be recycled.

The following examples are illustrative of the practice of the process of our invention but are not to be construed in any way as limitative thereof since various changes may be made in the light of the guiding principles and teachings contained herein.

EXAMPLE 1

A mixture of cyclohexanol and cyclohexanone, containing about 55% cyclohexanol and about 45% cyclohexanone, is vaporized and admixed with gaseous ammonia and hydrogen (in molar ratios of (a) 3.3:1 of the ammonia to said cyclohexanol-cyclohexanone mixture and (b) 6.5 to 1 of the hydrogen to said cyclohexanol-cyclohexanone mixture) and passed at atmospheric pressure into contact with a copper chromite nickel catalyst (40% copper chromite, 60% nickel) at a temperature of about 500° F. for a period of 10 seconds. A yield of about 65% cyclohexylamine based on the amount of conversion is obtained.

EXAMPLE 2

The process described in Example 1 is carried out except that the feedstock comprises a mixture of substantially equal parts of cyclohexanol and cyclohexanone, the molar ratios of the ammonia and of the hydrogen to the cyclohexanol-cyclohexanone mixture are, respectively, 4:1 and 8:1, and the reaction temperature is about 475 to 490° F. A high yield of cyclohexylamine is obtained.

We claim:

1. A process for the preparation of cyclohexylamine which comprises passing a mixture of cyclohexanol and cyclohexanone, together with ammonia and hydrogen, in the vapor phase at substantially atmospheric pressure, over a heated copper chromite/nickel catalyst containing from 10 to 75% copper chromite and 90 to 25% nickel, at a reaction temperature of 375 to 525° F., the molar ratio of the ammonia to the cyclohexanol-cyclohexanone mixture being at least 1:1, and the molar ratio of the hydrogen to the cyclohexanol-cyclohexanone mixture being at least 1.5:1, the contact time of the reaction mixture with the catalyst being from 1 to 30 seconds.

2. The process of claim 1, in which the temperature is maintained between about 400 and 500° F.

3. The process of claim 1, in which the ratio of cyclohexanol to cyclohexanone in the starting mixture is about 50 to 65% by weight of cyclohexanol, balance essentially cyclohexanone.

4. The process of claim 3, in which the temperature is maintained between about 400 and 500° F.

5. The process of claim 4, in which the molar ratio of the ammonia to the cyclohexanol-cyclohexanone mixture is in the range of 2:1 to 5:1, and the molar ratio of the hydrogen to the cyclohexanol-cyclohexanone mixture is in the range of 3:1 to 10:1.

6. The process of claim 5 in which the catalyst contains about 40% copper chromite and about 60% nickel supported on kieselguhr, and in which the molar ratio of the ammonia to the cyclohexanol-cyclohexanone mixture is about 3.3:1, and in which the molar ratio of the hydrogen to the cyclohexanol-cyclohexanone mixture is about 6.5:1.

7. The process of claim 1, in which the molar ratio of the ammonia to the cyclohexanol-cyclohexanone mixture is in the range of 2:1 to 5:1, and the molar ratio of the hydrogen to the cyclohexanol-cyclohexanone mixture is in the range of 3:1 to 10:1.

References Cited

FOREIGN PATENTS 1,492,098    7/1967    France _____ 260—563

CHARLES B. PARKER, Primary Examiner

D. R. PHILLIPS, Assistant Examiner